Figure 1:
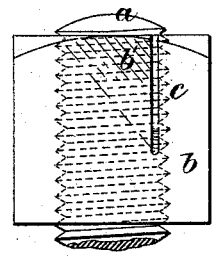

(No Model.) 3 Sheets—Sheet 1.

F. J. TALBOT.
NUT LOCK.

No. 413,580. Patented Oct. 22, 1889.

Attest.
Emma Arthur
Geo. E. Cruse

Inventor
Frederick John Talbot
By Knight Bros (No Model.) 3 Sheets—Sheet 2.

F. J. TALBOT.
NUT LOCK.

No. 413,580. Patented Oct. 22, 1889.

Attest.
Emma Arthur.
Geo. E. Cruse

Inventor
Frederick John Talbot.
By Knight Bros.

(No Model.) 3 Sheets—Sheet 3.

F. J. TALBOT.
NUT LOCK.

No. 413,580. Patented Oct. 22, 1889.

Attest:
Geo. T. Smallwood.
F. A. Hopkins

Inventor:
Frederick J. Talbot.
By Knight Bros.
Attys

UNITED STATES PATENT OFFICE.

FREDERICK JOHN TALBOT, OF RANMOOR PARK, SHEFFIELD, COUNTY OF YORK, ENGLAND.

NUT-LOCK.

SPECIFICATION forming part of Letters Patent No. 413,580, dated October 22, 1889.

Application filed July 23, 1888. Serial No. 280,764. (No model.) Patented in England August 15, 1887, No. 11,131, and in Victoria July 28, 1888, No. 6,022.

*To all whom it may concern:*

Be it known that I, FREDERICK JOHN TALBOT, engineer, a subject of the Queen of Great Britain, residing at Ranmoor Park, Sheffield, in the county of York, England, have invented certain new and useful Improvements in Lock-Nuts, (for which I have obtained Letters Patent in Great Britain, No 11,131, dated August 15, 1887, and in Victoria, No. 6,022, dated July 28, 1888;) and I do hereby declare that the following is a full, clear, and exact description of the invention, which will enable others skilled in the art to which it appertains to make and use the same.

In carrying my present invention into effect I first form a nut in the usual manner, and I then make a saw-cut or slit through one side thereof for a considerable depth. This saw-cut or slit may be either in a line parallel with the axis of the bolt or at an inclination thereto; and in some cases I form a weakening-groove in the side of the nut, which groove may be either parallel with the axis of the nut and at a short distance from and parallel with the aforesaid saw-cut or slit and of equal or unequal length, or it may be formed at an inclination to the saw-cut, whether the latter is parallel or not with the axis of the nut, in which latter case the said weakening-groove is preferably arranged to meet or closely approach the lower end of the saw-cut or slit; or I may extend the saw-cut or slit, which I form at an inclination with the axis of the bolt, through more than one side of the nut. Having treated a nut in any of the ways above described, I then force inward a portion of one side of the nut adjoining the saw-cut or slit, thereby causing an elastic triangular-shaped piece of metal with the threads thereon to encroach on the hole through the nut.

My invention is illustrated in the accompanying drawings, in the various figures of which like parts are indicated by similar letters of reference.

$a$ represents the bolt, and $b$ the nut, which are made in any ordinary or well-known manner.

$c$ is a saw-cut or slit made for a considerable depth through one side of the nut, so as to cut through the threads thereof, and $d$ is a weakening-groove formed in the side of the nut. These weakening-grooves $d$ are employed to facilitate the forcing inward of a triangular portion $b'$ of one side of the nut adjoining the saw-cut or slit $c$, and lying between the latter and the weakening-groove $d$, and also to reduce the resistance of the said portion $b'$ when screwing the nut upon the bolt. The saw-cut or slit $c$ may, however, be employed independently of the weakening-groove $d$.

Figure 3:
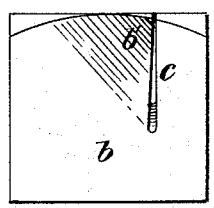
Figure 2:
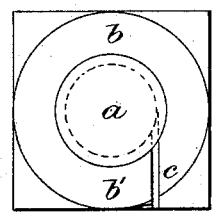
Figure 4:
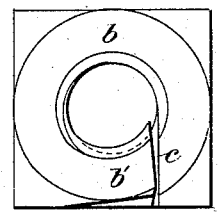

In the nut $b$ (represented at Figures 1, 2, 3, and 4) I make a saw-cut or slit $c$ through one side thereof in a plane parallel to one passing through the axis of the nut, and I force inward a portion $b'$ of one side of the nut adjoining the saw-cut or slit $c$ by applying pressure to the upper part thereof, thereby causing an elastic triangular-shaped piece $b'$, with the threads thereon, to encroach on the tapped hole as originally formed through the nut. The nut $b$ thus formed is shown separately at Figs. 3 and 4, while at Figs. 1 and 2 it is shown as it would appear after it has been screwed onto the bolt $a$.

Figure 5:
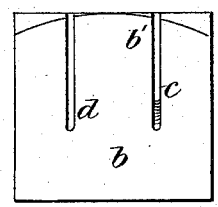
Figure 7:
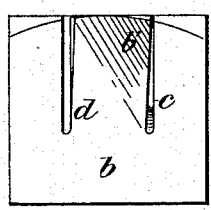
Figure 6:
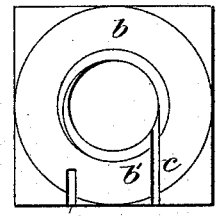
Figure 8:
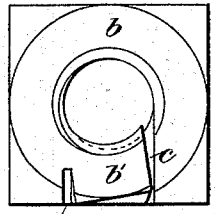
Figure 9:
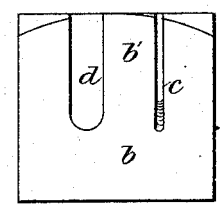
Figure 11:
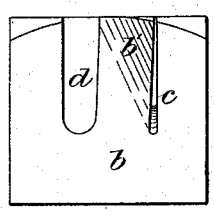
Figure 13:
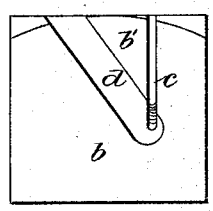
Figure 15:
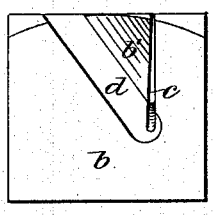
Figure 10:
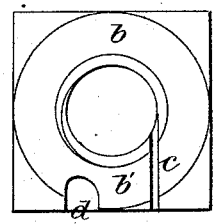
Figure 12:
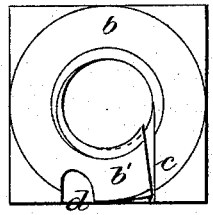
Figure 14:
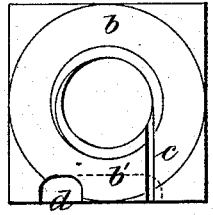
Figure 16:
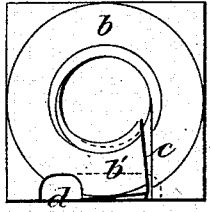
Figure 17:
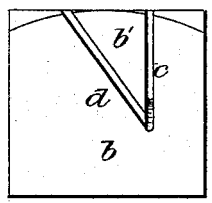
Figure 19:
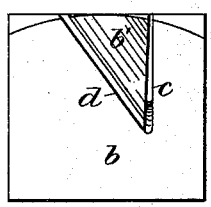
Figure 21:
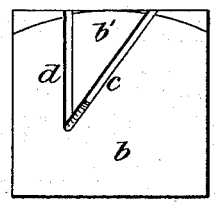
Figure 23:
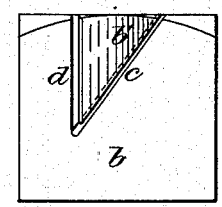
Figure 18:
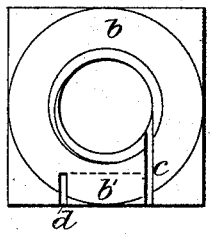
Figure 20:
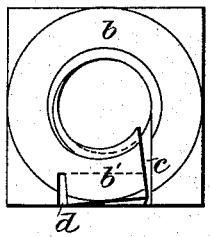
Figure 22:
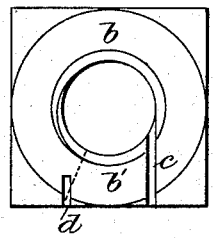
Figure 24:
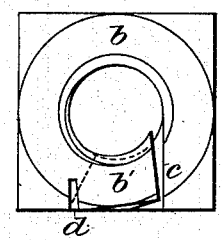
Figure 25:
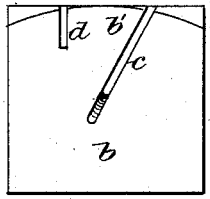
Figure 27:
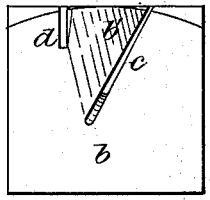
Figure 29:
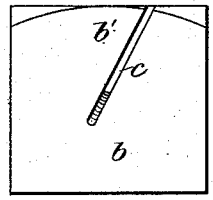
Figure 31:
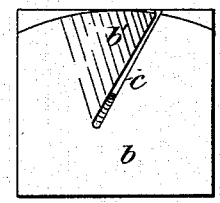
Figure 26:
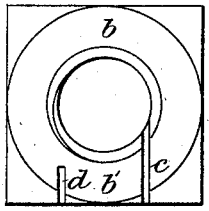
Figure 28:
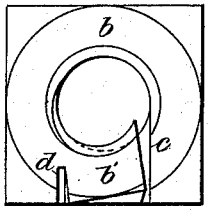
Figure 30:
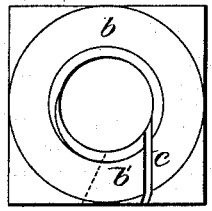
Figure 32:
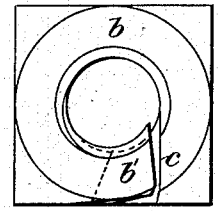
Figure 33:
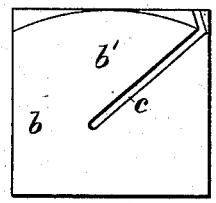
Figure 35:
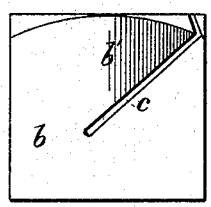
Figure 37:
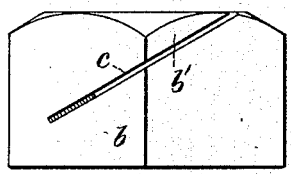
Figure 34:
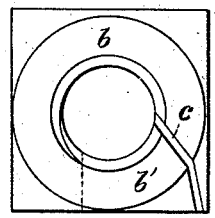
Figure 36:
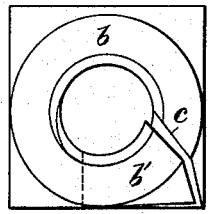
Figure 38:
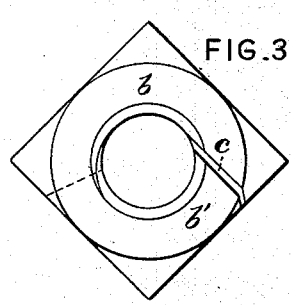
Figure 39:
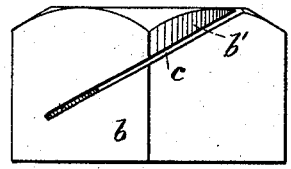
Figure 41:
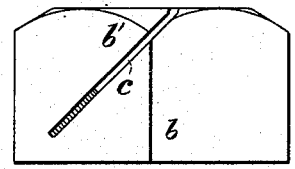
Figure 43:
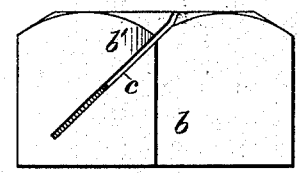
Figure 40:
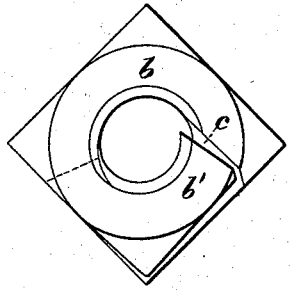
Figure 42:
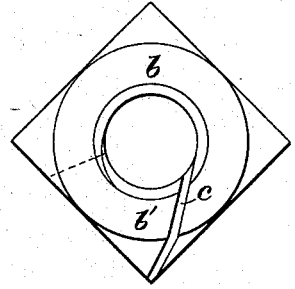
Figure 44:
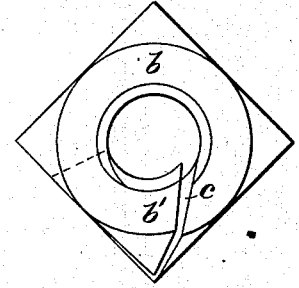

In the nut $b$ (represented at Figs. 5, 6, 7, and 8) a saw-cut or slit $c$ is made in a similar position to that of the nut shown at Figs. 1 to 4; but in addition thereto I employ a narrow weakening-groove $d$, parallel with the saw-cut or slit $c$, and I force inward that portion $b'$ of the side of the nut lying between the saw-cut or slit $c$ and the weakening-groove $d$ by applying pressure to the upper part thereof. At Figs. 5 and 6 the nut is shown with the saw-cut or slit $c$ and weakening-groove $d$ before the part $b'$ has been forced inward, and at Figs. 7 and 8 the nut is shown in its completed form.

In the nut represented at Figs. 9 to 12 a saw-cut or slit $c$ and weakening-groove $d$, parallel with each other, are employed, as in the nut represented at Figs. 5 to 8, except that the weakening-groove $d$ is broader in the one than in the other.

In the nut represented at Figs. 13 to 16 a saw-cut or slit $c$ is made parallel with the axis of the nut, as in those previously described; but the weakening-groove d is formed at an angle therewith, and so as slightly to overlap the bottom of the saw-cut or slit c. In this case the triangular-shaped piece b′ lying between the saw-cut c and the weaken-groove d is forced inward by applying pressure near to the upper angle thereof.

In the nut represented at Figs. 17 to 20 I employ a saw-cut or slit c and weakening-groove d in a similar manner to that described with respect to the nut represented at Figs. 13 to 16, except that the weakening-groove d is narrower in the one case than in the other.

In the nut represented at Figs. 21 to 24 I make the saw-cut or slit c at an inclination to the axis of the nut, while I make the weakening-groove d in a plane parallel therewith, otherwise the nut is similar to that represented at Figs. 17 to 20.

In the nut represented at Figs. 25 to 28 I make a saw-cut or slit c at an inclination to the axis of the nut in a similar manner to that described with respect to the nut shown at Figs. 21 to 24; but in the present case I use a shorter weakening-groove d than that shown in the previous figures.

In the nut represented at Figs. 29 to 32 I employ only the saw-cut or slit c, which I make in an angular direction from the top of the nut, commencing at the right side of the bore and extending beyond the center line of that side of the nut, and I force inward the part b′ by applying pressure thereto near the upper angle thereof.

In the nut represented at Figs. 33 to 36 I also make use of an angular saw-cut or slit c and dispense with the weakening-groove d; but I commence the saw-cut at the top right corner of one side of the nut.

By making the saw-cut or slit c either parallel with the axis of the nut or inclined thereto in a direction from right to left, as shown in the drawings, the triangular-shaped piece b′ will not be liable to be forced upward when screwing the nut upon the bolt; but the threads of the latter will lead naturally into the threads of the said triangular-shaped piece b′.

Figs. 37 to 44, inclusive, represent in side elevation and in plan the form having the saw-cut or slit c extending through more than one side of the nut, as hereinbefore mentioned.

It will be seen that in Figs. 37 to 40, inclusive, the saw-cut or slit c is started at a tangent to the bolt-hole and extends across the corner of the nut to about the center of the other side, whereas in Figs. 41 to 44 the slit or saw-cut is started at the corner of the nut.

In all of the species of the invention which I have described it will be observed that the tongue b′ when turned inward turns on an imaginary axis, which extends from the bottom of the saw-cut c to the top of the weakening groove or slit d, where such slit d is used, and where such slit d is not used the said axis will extend from the top of the nut at a distance from the point of the tongue b′ to the bottom of the saw-cut c, or, in other words, this imaginary axis in every instance forms with the saw-cut c and the upper edge of the tongue b′ a triangle. When a locking-tongue thus made is turned inward, it will no longer remain strictly concentric with the bolt, but its sharp inner edge or point will impinge the threads of the bolt in a direction transverse to the bolt's axis, as well as in a downward or perpendicular direction.

When employing a saw-cut in the construction of the above-described forms of lock-nut, such saw-cut may be made either before or after the tapping of the nut; but when employing a slit such slit must be made before the tapping of the nut.

By the aforesaid construction of lock-nut the hole therein for a certain portion of the length thereof is truly circular, so as to enable the nut to be freely screwed a certain distance onto the bolt; but so far as the form of such hole is affected by the forcing in of the triangular-shaped piece b′ that portion of the hole is gradually changed in form until at the top of the nut the said hole assumes somewhat the shape of one coil of a volute, by which means the nut offers a gradually-increasing resistance when being screwed onto the bolt, and such resistance reaches its maximum when the nut is fully screwed on. Thus when a nut constructed in any of the ways hereinbefore described is screwed on its bolt a considerable pressure will be required to screw it fully on, and the said elastic triangular-shaped piece of metal b′ will exert a constant pressure on the bolt to prevent the slackening or chattering back of the nut thereon, in addition to which the saw-cut c may be so made that the said elastic piece of metal b′ may have its internal edge, and consequently the ends of the threads thereon, formed at an acute angle, as shown in the drawings, so that the latter will have a tendency to cut into the threads of the bolt in any back action of the nut, and thereby further secure the nut on the bolt.

I am aware that it has been proposed to form lock-nuts by providing the nuts with saw-cuts extending in various directions, so that the regularity of the threads of such nuts will be destroyed, and thereby cause a binding action upon the bolt; but I am not aware that it has ever been proposed to form a lock-nut without destroying the integrity of the nut by providing the nut with a single saw-cut extending in such a direction as to form a triangular tongue projecting into the bore of the nut and adapted to impinge the threads of the bolt in an inward as well as in a downward direction, whereby the nut will be locked by the impingement of the sharp edge of the tongue against the bolt in addition to the binding action produced by the irregularity of the threads of the nut.

Having now particularly described and ascertained the nature of my said invention and in what manner the same is to be performed, I declare that what I claim is—

1. A lock-nut consisting of a nut having a saw-cut or slit through a portion of one side thereof, forming an angular tongue which is turned inward on an imaginary axis forming a triangle with said cut and the upper edge of said tongue, whereby the latter gradually encroaches upon the bore of the nut and will impinge the threads of the bolt in a downward as well as in an inward direction, substantially as shown and described.

2. A lock-nut consisting of a nut having a saw-cut or slit through a portion of one side thereof, said slit extending from the outer face or end of the nut diagonally across and into its bore and forming a triangular tongue, said tongue being forced inward encroaching upon the bore of the nut, whereby the threads on said tongue are adapted to impinge the threads of the bolt in a longitudinal as well as an inward or transverse direction to said bolt, and the encroachment of the threads of such tongue gradually increasing from the lower or inner end of the slit upward or outward toward the upper or outer face of the nut, and also from the lower toward the upper end of the said slit, substantially as and for the purposes set forth.

FREDERICK JOHN TALBOT.

Witnesses:
B. J. B. MILLS,
C. M. WHITE,
*Both of 23 Southampton Buildings, London, England.*